United States Patent [19]

Olsen

[11] 4,013,155

[45] Mar. 22, 1977

[54] SINGLE LEVER CONTROL UNIT WITH THROTTLE LEVER

[75] Inventor: Roger Fred Olsen, Cuyahoga Falls, Ohio

[73] Assignee: Incom International Inc., Pittsburgh, Pa.

[22] Filed: Mar. 3, 1975

[21] Appl. No.: 555,022

[52] U.S. Cl. .................................. 192/.096; 74/879
[51] Int. Cl.² .................. B60K 41/00; B60K 41/02
[58] Field of Search .... 192/.096; 74/848, 872–875, 74/473 R, 473 P, 879

[56] References Cited

UNITED STATES PATENTS

| | | | |
|---|---|---|---|
| 2,919,772 | 1/1960 | Morse | 192/.096 |
| 3,204,733 | 9/1965 | Morse | 192/.096 |
| 3,250,350 | 5/1966 | Shimanckas | 192/.096 |
| 3,780,842 | 12/1973 | Whipple et al. | 192/.096 |
| 3,828,902 | 8/1974 | Saito et al. | 192/.096 |

Primary Examiner—Leonard H. Gerin
Attorney, Agent, or Firm—James C. Wray

[57] ABSTRACT

A single lever control for controlling engine, said control having a housing, a throttle actuating arm and a clutch actuating arm operatively connected thereto for rotation only during the first portion of rotation of the throttle actuating arm, said arms adapted for connection to the cores of push-pull cables for opening and closing the throttle and operating the clutch of said engine, the improvement comprising a warm-up auxiliary throttle lever operatively attached to a bracket means slidably mounted on said housing, said bracket means attached to the throttle cable conduit to move the cable conduit relative to said throttle cable core thereby adjusting throttle setting of said engine, interlocking means including an interengaging means carried by said bracket means, said interengaging means when engaging the outer surface of said throttle actuating arm prohibits the movement of said auxiliary throttle lever when said single lever is moved generally away from its neutral position and said interengaging means when disposed a certain distance within a slot in said throttle actuating arm prohibits movement of said single lever when said single lever is moved generally to its neutral position.

12 Claims, 4 Drawing Figures

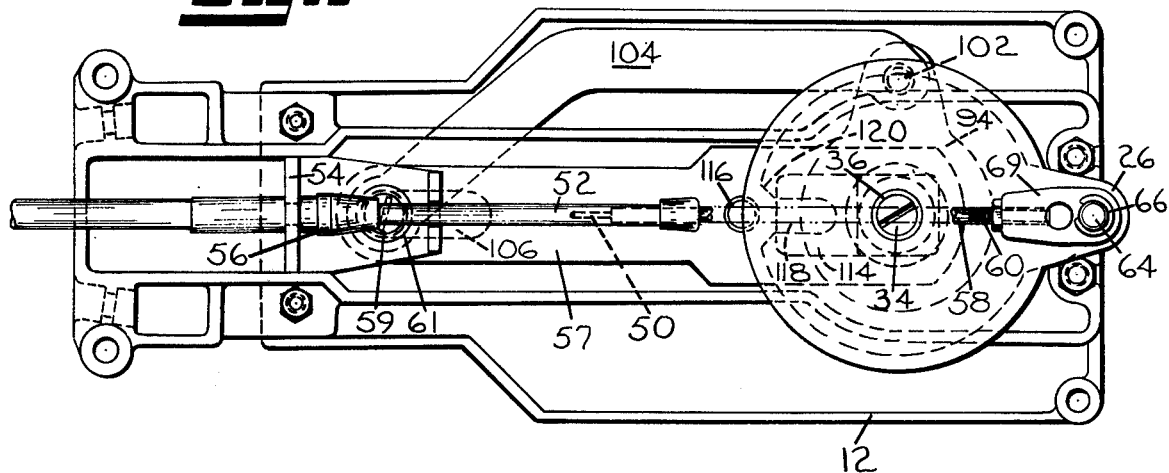
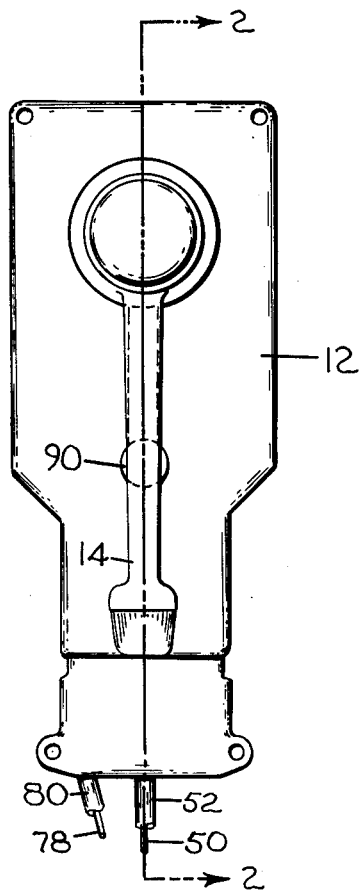

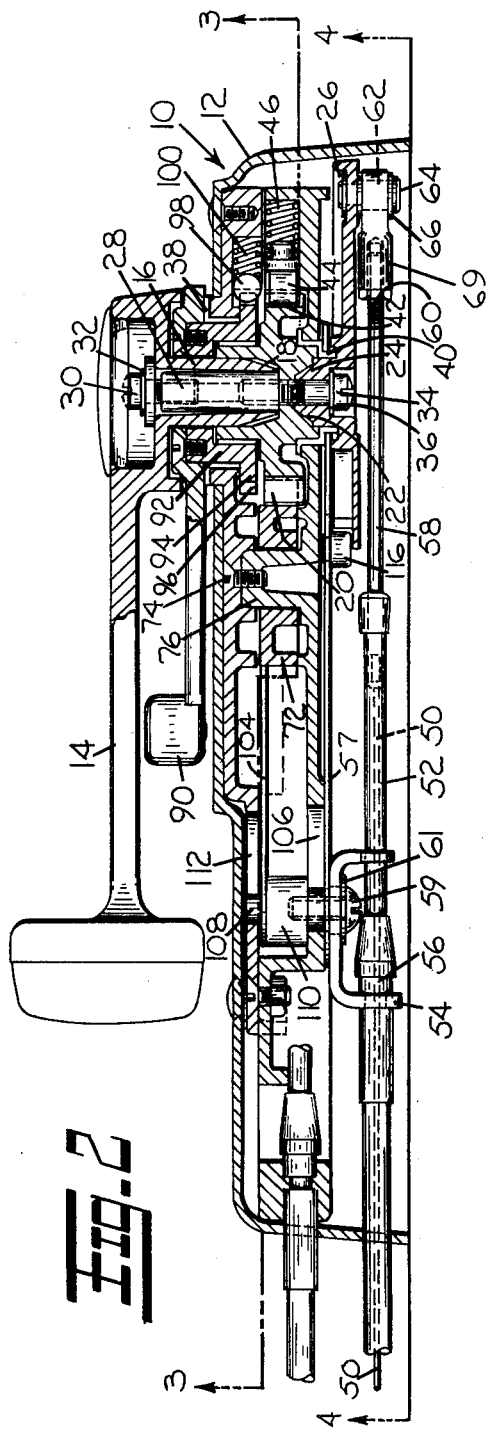
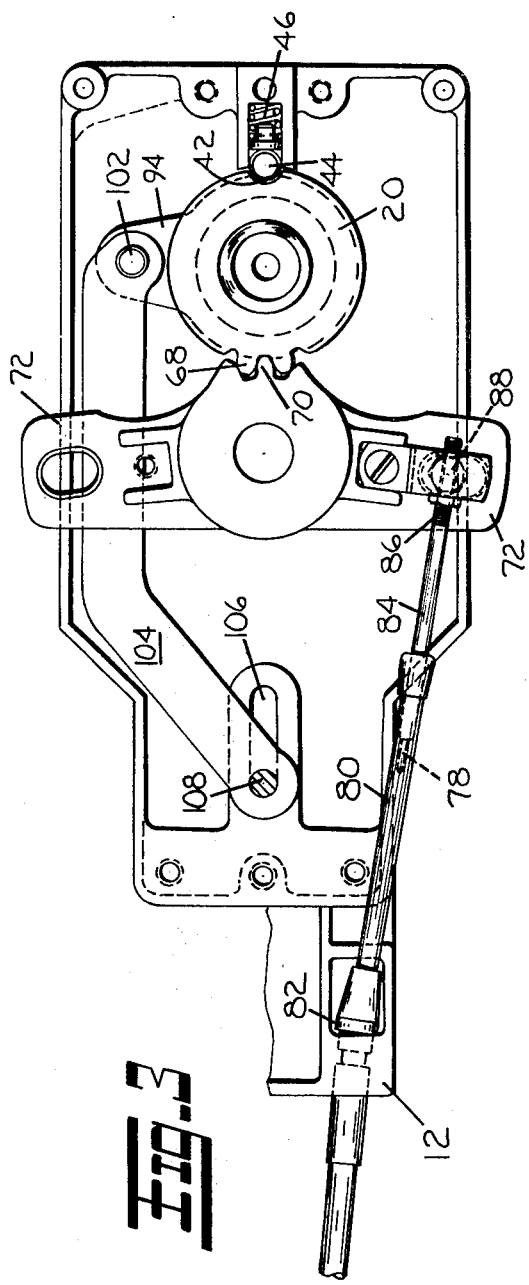

SINGLE LEVER CONTROL UNIT WITH THROTTLE LEVER

HISTORY OF THE INVENTION

This invention relates generally to a single lever control particularly adapted for marine engines and more specifically to an improved single lever control for such marine engines.

Outboard marine engines as well as inboard-outboard marine engines must be designed for operation by operators of various degrees of experience. Accordingly, a single lever control for such engines is desirable because of its relative simplicity and ease of operation. A satisfactory single lever control has three basic functions to perform: (1) it must shift the engine to forward or reverse while moving through a shift range, without materially advancing the throttle; (2) it must open the throttle desired amount when moved beyond the shift range in either direction through a throttle; and (3) it should allow some opening of the throttle without shifting for starting and particularly for warming up the engine.

Marine engines are frequently provided with interlocking devices to prevent excessive throttle opening in neutral or in entering the shift range, but it is desirable to remove such devices when an engine is operated by remote single lever controls or to minimize the loads on the control lever. When this is done positive means must be provided in the control to limit the throttle opening in neutral, and also in the reverse range since excessive speeds in the reverse are dangerous as well as unnecessary.

In the context of the above noted parameters, it is important that a single lever control also be provided with the capability of effectively warming the engine up without requiring specific alteration of the throttle adjustment. Obviously, the warmup of the remotely controlled engine is important so that when the engine is shifted into the forward or reverse range it will not stall.

A number of prior art patents have been directed to this general problem, such as U.S. Pat. No. 3,780,842 to Roger B. Whipple, patented Dec. 25, 1973. Similarly, U.S. Pat. No. 2,987,152 to J. F. Morse, patented June 6, 1961 is also generally related to the basic problem of providing effective warm-up means on a single control lever mechanism. It may be said of the prior art as typified by the above-noted Whipple patent that the single lever controls are complex and the provision of the throttle warm-up mechanism simply compounds the complexity of an already complex mechanism.

SUMMARY OF THE INVENTION

It is therefore a primary object of the present invention to provide a single lever control for controlling engine, said control having a housing, throttle actuating arm and a clutch actuating arm operatively connected thereto for rotation only during the first portion of rotation of the throttle actuating arm, said arms adapted for connection to the cores of push-pull cables for opening and closing the throttle and operating the clutch of said engine, the improvement comprising a warm-up auxiliary throttle lever operatively attached to a bracket means slidably mounted on said housing, said bracket means attached to the throttle cable conduit to move the cable conduit relative to said throttle cable core thereby adjusting throttle setting of said engine, interlocking means including an interengaging means carried by said bracket means, said interengaging means when engaging the outer surface of said throttle actuating arm prohibits the movement of said auxiliary throttle lever when said single lever is moved generally away from its neutral position and said interengaging means when disposed a certain distance within a slot in said throttle actuating arm prohibits movement of said single lever when said single lever is moved generally to its neutral position.

It is another object of the present invention to provide a single lever control wherein the engaging means is a roller carried by the bracket means.

It is yet another object of the present invention to provide a single lever control unit wherein the bracket means moves the throttle cable conduit in a direction substantially opposite to the normal movement of the throttle cable core by the throttle actuating arm and the slot in the throttle actuating arm with the roller carried by the bracket means when the throttle actuating arm is in the neutral position.

It is still another object of the present invention to provide a single lever control unit wherein the bracket means includes a first and second leg, the first leg being operatively attached to one end thereof to an auxiliary throttle lever and at the other end to the second leg, the roller being carried by the second leg.

It is still another object of the present invention to provide a single lever control unit wherein the slot in the throttle actuating arm terminates at its open end in two oppositely disposed cammed surfaces.

It is still another object of the present invention to provide a single lever control unit wherein the slot is substantially Y-shaped.

It is still another object of the present invention to provide a single lever control unit wherein the roller means prohibits the movement of the single lever when the auxiliary throttle lever is moved generally to a position to advance the roller within the slot beyond the cam surfaces.

It is still another object of the present invention to provide a single lever control unit wherein the throttle lever is adapted to be moved to its minimum setting when the roller is displaced by the cam surfaces of the slot in the throttle actuating arm when the throttle actuating arm is moved in a clockwise or counterclockwise direction.

It is a further object of the present invention to provide a single lever control unit wherein the first leg is attached to the auxiliary throttle lever by pivot means.

It is yet another object of the present invention wherein the outer surface of the throttle actuating arm is generally cylindrical in shape.

It is yet another object of the present invention to provide a single lever control unit wherein there are provided two travel stops on the outer surface of the throttle actuating arm, the roller abutting each of the stops to limit the clockwise and counterclockwise motion of the actuating arm.

It is still another object of the present invention to provide a single lever control unit wherein the second leg travels in a linear fashion.

It is another object of the present invention to provide a single lever control unit of a highly efficient design and capable of being inexpensively manufactured.

It is still another object of the present invention to provide a single lever control unit which can be manufactured using automated high volume techniques.

Other objects and advantages of the invention will become apparent as the present invention is better understood from the following disclosure as shown in the accompanying drawings.

DESCRIPTION OF THE DRAWINGS

FIG. 1 is a front elevational view of an embodiment of an improved control having an auxiliary throttle lever in accordance with the present invention;

FIG. 2 is a plan sectional view of the unit of FIG. 1 taken along line 2—2;

FIG. 3 is an inside elevational view of the control of FIG. 1 taken along line 3—3 of FIG. 2 with certain parts being broken away and in section;

FIG. 4 is an inside elevational view of the control of FIG. 1 taken along line 4—4 of FIG. 2 with certain parts broken away and in section.

DESCRIPTION OF THE INVENTION

Referring now to the figures, there is shown therein a single lever control 10 for controlling engines as, for example, inboard/outboard engines for marine applications. The single lever control 10 is provided with a control housing 12 which comprises and includes a number of individual supporting parts. The control housing 12 serves a multiplicity of functions, including a support for the various operative parts involved in the control 10, and an environmental enclosure to protect the various parts from the surrounding elements. Additionally, the control housing 12 may serve the additional function of providing the attachment means of the single lever control 10 to a bulkhead wall or other structure (not shown).

The attachment of the single lever control 10 to such bulkhead can be effected by many different forms of attaching means, such as nut and bolt arrangements, sheet metal screws or the like (not shown). The single lever control 10 is further provided with a hand lever 14 which is rotatably mounted on the housing 12 by means of certain bearing means which will be explained below in further detail. The hand lever 14 is provided with a shaft extension 16 which longitudinally extends from the lever portion. The shaft extension 16 could, of course, be formed integrally with the hand lever 14 as in the present case or could be formed as a separate member. The shaft extension 16 fits within the drive gear bore 18 of the intermittent drive gear 20. The intermittent drive gear 20 is also provided with another bore 22 oppositely disposed to the drive gear bore 18 which accommodates the shaft extension 16 of the hand lever 14. This oppositely disposed bore 22 or cavity accommodates the extension 24, that is, the throttle actuator arm extension 24 of the throttle actuator arm 26. The lever arm 14 is fixedly attached to a central support shaft 28 by suitable attaching means such as a threaded screw 30 and washer 32, which screw 30 is threadably attached to said central shaft 28.

Similarly, the throttle actuator arm 26 and intermittent drive gear 20 are also fixedly attached to the central support shaft 28 by attaching means, such as the second screw and second washer 34 and 36, respectively which screw 34 is also threadably attached to said support shaft 28.

It can be seen, therefore, that the hand lever 14 and the intermittent drive gear 20 and throttle actuator arm 26 rotate as a unit and are fixedly attached to each other to rotate thereby. It can be also seen that this rotatable unit is so nested together so as to reduce to a minimum their overall longitudinal dimensional profile. Their rotational movement in the housing 12 is supported by a first bearing 38 and second bearing 40. The function of the bearing 38 and 40 will be further described below.

The outer periphery of the intermittent drive gear 20 may be provided with a series of detents 42. These detents 42 are adapted to be engaged by a ball or roller means 44 which is biased in the direction of the outer periphery of the intermittent drive gear 20 by a spring means 46. The detents 42 provide a positioning detecting means for the operator of the lever, that is, the operator will "feel" the resistance to movement of the hand lever 14 when the spring means 46 biases the ball 44 into the detents 42.

As before mentioned, one of the primary purposes of the single lever control is to operate the throttle of an engine (not shown) remote from the control 10. The throttle cable core 50 is attached at appropriate place to such controlled engine for controlling its throttle position. The motor which is not shown will not be further described. The throttle cable core 50 is housed within and slidably supported by a cable conduit 52. The cable core 50 and the cable conduit 52 combination is of a standard variety and is anchored to a throttle swivel bracket 54 which is pivotably supported on a neutral interlock link member 57 which in turn is slidably supported on the housing 12 in a manner to be later described.

The throttle conduit 52 is provided with an end fitting 56 which has a grooved portion and the end fitting which is fixedly attached to the throttle cable conduit 52 at the end thereof. The cable conduit 52 is anchored to the throttle swivel bracket 54 at the grooved portion of the fitting 56. The throttle swivel bracket 54 is pivotably attached to the interlock link member 57 by suitable attaching means such as a threaded machine screw 59 and washer 61, said screw being threadably attached to the interlock link member 57. The throttle cable core 50 is provided with a core extension 58 which has at its end thereof a threaded portion 60. The core is operatively attached to the throttle actuator arm 26 by a bearing member 62 which rotatably engages a pin member 64 on the throttle actuator arm 26. The bearing member 62 is axially secured to the pin 64 by appropriate securing means, such as a snap ring 66 or the like.

It can be seen therefore that as the hand lever 14 is moved in a clockwise or counterclockwise fashion it will rotate the intermittent drive gear 20 and the throttle actuator arm 26 in a clockwise or counterclockwise direction about their common axis as generally defined by the central support shaft 28. This entire assembly, as before mentioned, is rotatably supported within the housing 12 by first bearing 38 and second bearing 40. As the movement of the hand lever 14 continues, the throttle actuator arm 26 will move the cable core extension 58 and the throttle cable core 50 to which it is attached relative the throttle cable conduit 52. This relative movement will change the throttle setting on the engine remote from the control 10.

It can be further seen as the throttle actuator arm 26 rotates, the throttle cable conduit 52 and the throttle cable core 50 will pivot about the axis of the bearing support means 61 which pivotably supports the throttle swivel bracket 54. Accordingly, the rotational movement of the throttle actuator arm 26 is translated into linear motion of the throttle cable core 50.

Referring now to the intermittent drive gear 20, as before mentioned, it is moved in a clockwise or counterclockwise motion as determined by the movement of the hand lever 14 to which it is operatively attached. The intermittent drive gear 20 is provided with a series of teeth 68 on its outer periphery. These teeth 68 engage and intermesh with teeth 70 provided on an intermittent gear shift arm 72. The gear shift arm 72 is pivotably attached to the housing 12 by suitable attaching means such as machine screw 74. The gear shift arm 72 is rotatably supported on the housing 12 by bearing 76. The clutch cable core 78 is disposed within and slidably supported by the clutch cable conduit 80 and in manner as before described with respect to the throttle cable conduit core 50 and conduit 52, the clutch cable conduit is provided with a grooved end fitting 82 which provides the anchoring means for anchoring the cable assembly directly to the housing 12. The clutch cable core 78 is attached to the shift mechanism of the transmission of the aforementioned engine being controlled by the single lever control 10, the engine not being shown. The clutch cable core 78 is also provided with an extension 84 which also has at its end a threaded portion 86 which is connected to one end of the intermittent gear shift arm 72 by suitable fastening means such as the threaded terminal 88. As before mentioned, the intermittent drive gear 20 will move with the hand lever and, as it is moved in a clockwise or counterclockwise direction, the partial rotary motion will drive the gear shift arm 72 through the meshing action of the complementary teeth 68 and 70 in a direction opposite to the direction of the hand lever 14. This rotary motion of the gear shift arm 72 moves the cable core 78 with respect to the cable conduit 80 thereby adjusting the clutch or shift position of the transmission of the engine.

It may be stated at this juncture that the structure before described is in general terms similar to the prior art forms of single lever controls. The thrust of the present invention is to be found in the provision of the auxiliary throttle lever 90. While auxiliary throttle levers, in general, have been provided for in the prior art, the present invention uniquely combines the auxiliary throttle lever function with other functions which result in an improved single lever control with advanced performance characteristics. The first thing that becomes apparent about the auxiliary throttle lever 90 is its position with respect to the hand lever 14. In particular, the auxiliary throttle lever 90 has the same axis of rotation as the hand lever 14, or, in other words, is positioned concentric with the extension 16 of the hand lever 14. The auxiliary throttle lever 90 is rotatably mounted on the housing 12 at the first bearing 38. It can be seen that first bearing 38 provides certain of the bearing support for the assembly of the hand lever 14, intermittent drive gear 20 and throttle actuator arm 26 and also provides the bearing support, at its outer surface, for the rotational movement of the auxiliary throttle lever 90.

The auxiliary throttle lever 90 is provided with an extension 92. It is this extension 92 which is bearingly supported by the first bearing 38. The auxiliary throttle lever extension 92 is provided with a rim portion 94 which has on its outer periphery a detent 96. A ball or roller means 98 is spring biased toward the outer periphery of the rim 94 of the extension 92 of the auxiliary throttle lever 90 by a spring means 100 such as spring 100 or the like. The rim 94 of the auxiliary throttle lever extension 92 carries on it a pin or other suitable pivotal connecting means 102. A throttle link member 104 is pivotably connected to the auxiliary throttle lever 90 at the pin 102 and is operatively secured in place by suitable fastening means, such as a snap ring or the like. The throttle link member 104 is slidably supported at its other end in a slot 106 provided in the housing 12. In particular, the throttle link member 104 is provided with an additional pin member 108 which is slidably disposed in the longitudinally extending slot 106. The pin member 108 may be simply an extension of the machine screw 59.

As before mentioned, the throttle cable conduit 52 was anchored to the swivel bracket 54 at the conduit's grooved end fitting 56 and was secured or anchored in place to a throttle swivel bracket 54. As also before mentioned, the throttle swivel bracket 54 was pivotably attached to the neutral interlock link member 57. Further, the machine screw 59 is threadably attached to a connecting block 110 which interconnects the pin 108 and machine screw 59, the machine screw 59 having a portion of its shank slidably disposed in a longitudinally extending slot 112 provided in the housing. Slots 106 and 112 are in alignment extending in the same direction. The neutral interlock link member 57 is provided at its other end with slot 114 therein which extends in the same direction as slots 106 and 112 and this slot 114, which captures bearing 40 and is guided thereby, guides in combination with longitudinally extending slot 112 the linear movement of the neutral interlock link member 57 and the throttle swivel bracket 54 carried by the link member 57.

Accordingly, it can be seen that the movement of the auxiliary throttle lever 90 will cause the pin 102 provided on its rim 94 to move in a clockwise or counterclockwise fashion. The movement of this pin 102 will in turn move the throttle link member 104 in a generally linear fashion. As the throttle link member 104 is moved, it will be guided by the pin member 108 sliding in slot 106 and this movement will in turn move the connecting block 110 to which the machine screw 59 is also threadably attached. The machine screw 59 will move the neutral interlock link member 57 in unison with the throttle link member 104. As the throttle link member 104 is thereby moved, the throttle swivel bracket 54 carried by the member 57 will likewise move thereby moving the cable conduit 52 anchored thereto. The movement of cable conduit 52 will be independent of any movement of the cable core 50 which will be held in place at pin 64. Therefore, as the relative linear motion occurs between the cable core 50 and conduit 52, the throttle setting on the engine will be adjusted according to the wishes of the operator as determined by the extent of the movement of the auxiliary throttle lever 90.

As before mentioned, the basic purpose of providing the auxiliary throttle lever 90 is to enable the operator to warm up the engine being controlled by the single lever control 10 without having to mechanically change any of the settings back at the engine location. This latter procedure would, of course, be totally unsatisfactory and would require disassembly and assembly of various parts of the engine to effect the warmup of the engine. The auxiliary throttle lever 90 effects a change in the relative position of the throttle and, accordingly, the throttle setting may be changed independent of the motion or movement of the hand lever 14.

If the engine is being warmed up at a high R.P.M. level and if the transmission were allowed to be shifted, the result could be disastrous in terms of damage to both the transmission and engine and possible injury to the operator and occupants of the boat. Therefore, it is important that beyond a certain speed of the engine that interlock means be provided to avoid a shifting of the engine at an undesirably high speed. To effect this purpose, a roller means 116 is provided on and carried by the neutral interlock link member 57. As the neutral interlock link is moved by the action of the auxiliary throttle lever 90 in the manner as before discussed and described, the roller means 116 will travel toward or away from the throttle actuator arm 26. The throttle actuator arm 26 has provided in the outer periphery an interlock slot 118 which is adapted to accommodate the roller means 116 when the arm 26 and hand lever 14 are in their neutral position (i.e., idle engine speed and neutral shift position). If the slot 118 was out of registration with the roller means 116, the roller means 116 would encounter the outer surface of the throttle actuator arm 26 thereby blocking the movement of the auxiliary throttle lever 90. The several detents 42 and 96 will positionally locate the neutral positions of both the hand lever 14 and auxiliary throttle lever 90 for the operator. Therefore the warm-up procedure can be only initiated when the hand lever 14 is in its neutral position such that the interlock slot 118 is in alignment with and will accommodate the roller means 116 carried by the neutral or interlock link 57.

A further unique feature of the present invention is to be found in the provision of camming surfaces 120 provided at the open end of the interlock slot 118. The camming surfaces 120 can be generated in different configurations depending upon the application involved. The camming surfaces effect the "camming back" of the roller means 116 when the roller means 116 was only partially in the interlock slot 118. Therefore the throttle lever 90 could be advanced by the operator to effect a certain throttle adjustment of the engine and at the same time allow the operator to shift the engine by use of the hand lever 14 only when the auxiliary throttle lever 90 is advanced to a pre-selected range as defined by the camming surfaces 120. If the roller means 116 travels beyond the camming surfaces 120, then the throttle actuator arm 26 will be interlocked in its neutral position.

Various modifications of the single lever control of the present invention may be made without departing from the spirit or scope thereof and it is to be understood that this invention is to be limited only as defined in the appended claims.

I claim:

1. A single lever control for controlling engine, said control having a housing, a throttle actuating arm and a clutch actuating arm operatively connected thereto for rotation only during the first portion of rotation of the throttle actuating arm, said arms adapted for connection to the cores of push-pull cables for opening and closing the throttle and operating the clutch of said engine, the improvement comprising a warm-up auxiliary throttle lever operatively attached to a bracket means slidably mounted on said housing, said bracket means attached to the throttle cable conduit to move the cable conduit relative to said throttle cable core thereby adjusting throttle setting of said engine, interlocking means including an interengaging means carried by said bracket means, said interengaging means when engaging the outer surface of said throttle actuating arm prohibits the movement of said auxiliary throttle lever when said single lever is moved generally away from its neutral position and said interengaging means when disposed a certain distance within a slot in said throttle actuating arm prohibits movement of said single lever when said single lever is moved generally to its neutral position.

2. A single lever control unit in accordance with claim 1 wherein said interengaging means is a roller carried by said bracket means.

3. A single lever control unit in accordance with claim 2 wherein said bracket means moves said throttle cable conduit in a direction substantially opposite to normal movement of the throttle cable core by said throttle actuating arm and said slot in said throttle actuating arm being in alignment with said roller carried by said bracket means when said throttle actuating arm is generally in the neutral position.

4. A single lever control unit in accordance with claim 1 wherein said slot in said throttle actuating arm terminates at its open end in two oppositely disposed cam surfaces.

5. A single lever control unit in accordance with claim 4 wherein said slot is substantially Y-shaped.

6. A single lever control unit in accordance with claim 4 wherein said roller prohibits the movement of said single lever when said auxiliary throttle lever is moved generally to a position to advance said roller within said slot beyond said cam surfaces.

7. A single lever control unit in accordance with claim 4 wherein said throttle lever is adapted to be moved to its minimum setting when said roller is displaced by the cam surfaces of said slot in said throttle actuating arm when said throttle actuating arm is moved in a clockwise or counterclockwise direction.

8. A single lever control unit in accordance with claim 3 wherein said first leg is attached to said auxiliary throttle lever by pivot means.

9. A single lever control unit in accordance with claim 3 wherein said outer surface of said throttle actuating arm is generally cylindrical in shape.

10. A single lever control unit in accordance with claim 8 wherein there are provided two travel stops on the outer surface of said throttle actuating arm, said roller abutting each of said stops to limit the clockwise and counterclockwise motion of said throttle actuating arm.

11. A single lever control unit in accordance with claim 3 wherein said second leg travels in linear fashion.

12. A single lever control unit in accordance with claim 4 wherein the single lever control and said warm-up auxiliary throttle lever have the same axis of rotation.

* * * * *